(12) United States Patent
Moran et al.

(10) Patent No.: US 10,089,622 B2
(45) Date of Patent: *Oct. 2, 2018

(54) SYSTEMS AND METHODS FOR PERFORMING FUNDS FREEZE AND/OR FUNDS SEIZURE WITH RESPECT TO PREPAID PAYMENT CARDS

(71) Applicant: Vantiv, LLC, Symmes Township, OH (US)

(72) Inventors: Patrick James Moran, Cincinnati, OH (US); Nancy Joann Vance, Fenton, MI (US); Michele Suzanne Herron, Cincinnati, OH (US); Thomas Edward Rafferty, Cincinnati, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,018

(22) Filed: Jun. 9, 2017

(65) Prior Publication Data
US 2017/0278101 A1 Sep. 28, 2017

Related U.S. Application Data

(60) Continuation of application No. 14/270,471, filed on May 6, 2014, now Pat. No. 9,710,810, which is a division of application No. 13/858,428, filed on Apr. 8, 2013, now Pat. No. 8,762,266.

(60) Provisional application No. 61/644,094, filed on May 8, 2012.

(51) Int. Cl.
| | | |
|---|---|---|
| G06Q 20/38 | (2012.01) | |
| G06Q 50/34 | (2012.01) | |
| G06Q 20/28 | (2012.01) | |
| G06Q 20/40 | (2012.01) | |
| G06Q 20/34 | (2012.01) | |
| G06Q 50/26 | (2012.01) | |

(52) U.S. Cl.
CPC ............ *G06Q 20/38* (2013.01); *G06Q 20/28* (2013.01); *G06Q 20/342* (2013.01); *G06Q 20/405* (2013.01); *G06Q 20/407* (2013.01); *G06Q 20/4016* (2013.01); *G06Q 20/4037* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 6,714,918 B2 * | 3/2004 | Hillmer | G06Q 20/206 705/18 |
| 7,575,157 B2 * | 8/2009 | Barnhardt | G06Q 20/04 235/379 |

(Continued)

*Primary Examiner* — Robert R Niquette
(74) *Attorney, Agent, or Firm* — Bookoff McAndrews, PLLC (57) ABSTRACT

Systems, mechanisms and processes are provided to allow law-enforcement officials, when encountering the potential use of prepaid payment cards in the furtherance of a crime or in relation to criminal activities, to (1) attempt to check the balances on such prepaid payment cards, including the ability to perform aggregate balance checks on a group of such prepaid cards, (2) attempt to freeze the funds on such prepaid payment cards, and/or (3) attempt to seize the funds on such prepaid payment cards.

17 Claims, 5 Drawing Sheets

(56) References Cited

U.S. PATENT DOCUMENTS

| | | | | |
|---|---|---|---|---|
| 2006/0271457 A1* | 11/2006 | Romain | ............... | G06Q 20/04 |
| | | | | 705/35 |
| 2007/0073617 A1* | 3/2007 | Tolbert | ............... | G06Q 20/10 |
| | | | | 705/39 |
| 2010/0174649 A1* | 7/2010 | Bouchard | ............ | G06Q 20/02 |
| | | | | 705/44 |
| 2010/0174660 A1* | 7/2010 | Clark | ................ | G06Q 20/403 |
| | | | | 705/318 |
| 2011/0302083 A1* | 12/2011 | Bhinder | .............. | G06Q 20/32 |
| | | | | 705/44 |
| 2013/0024289 A1* | 1/2013 | Cueli | ................ | G06O 20/027 |
| | | | | 705/14.65 |

* cited by examiner

SYSTEMS AND METHODS FOR PERFORMING FUNDS FREEZE AND/OR FUNDS SEIZURE WITH RESPECT TO PREPAID PAYMENT CARDS

CROSS-REFERENCE TO RELATED APPLICATIONS

The present application is a continuation of U.S. application Ser. No. 14/270,471, filed May 6, 2014, which is a division of U.S. application Ser. No. 13/858,428, filed Apr. 8, 2013, now U.S. Pat. No. 8,762,266, which claims the benefit of U.S. Provisional Application Ser. No. 61/644,094, filed May 8, 2012; all of which are incorporated herein by reference in their entireties.

BACKGROUND

The present disclosure contemplates that the estimated size of criminal activity that involves some form of cash proceeds is nearly $100 billion in the United States. Conventionally, most of this money has been moved by courier and was laundered through sophisticated networks.

The advent of prepaid payment cards is making cash less relevant and improving the criminals' ability to move funds in innocuous manners. Law enforcement organizations at every level are seeing increasing movement to prepaid payment card use in crime. Law enforcement organizations, however, currently have no means to seize funds "loaded on" or associated with prepaid payment cards. Therefore, the funds from criminal activities are often still maintained by many of these criminal organizations. Additionally, the identifying data obtained through this process may be highly valued by law enforcement organizations.

The present disclosure contemplates that prepaid payment cards (associated with prepaid accounts) can be issued from any country that a bank is a member of a payment network such as MASTERCARD® or VISA®. Prepaid virtual accounts are growing in global use and accessible with a mobile device, making the plastic card required only for automated teller machine transactions.

The present disclosure further contemplates that there is no central database to record prepaid payment card activity. Therefore, prepaid payment cards are increasingly used for criminal purposes, including payment for criminal activity and to commit criminal acts. Some examples include drug-related activities, prostitution activities, and money laundering activities. Governmental agencies, such as the U.S. Department of Homeland Security, may desire to curb the use of prepaid payment cards in association with such criminal activity, and seize the funds and identifying data associated with the prepaid payment cards (and their corresponding prepaid accounts).

Capturing funds and identifying data associated with prepaid payment cards and looking for patterns may assist law enforcement entities in identifying banks that support illegal activity.

SUMMARY

A method for processing prepaid payment cards is disclosed. A networked central database including information on one or more payment cards, may be maintained. A predetermined deposit account may be provided for holding seized prepaid payment card funds. Mechanisms and/or processes for freezing funds on prepaid payment cards may toe provided. Mechanisms and/or processes for seizing funds on prepaid payment cards may be provided. Mechanisms and/or processes for performing batch or aggregate balance inquiries on groups of prepaid payment cards may be provided.

Generally, the current disclosure provides systems, mechanisms and processes for law-enforcement officials, when encountering the potential use of prepaid payment cards in the furtherance of a crime or in relation to criminal activities, to (1) attempt to check the balances on such prepaid payment cards, including providing the ability to perform batch or aggregate balance inquiries on groups of such prepaid payment cards, (2) attempt to freeze the funds on such prepaid payment cards, and/or (3) attempt to seize the funds on such prepaid payment cards.

Identification data may be generated, including one or more of generating a unique jurisdiction merchant ID for each government or law-enforcement jurisdiction, generating a unique jurisdiction location merchant ID for each location in each respective jurisdiction, generating one or more "Doing Business As" (DBA) identifiers associated with a seizure transaction, providing a plurality of merchant category codes, or registering one or more merchant ID numbers for a payment network.

A card reading terminal may be used to check the prepaid card "type" against a set of predetermined BIN ranges. If within a certain range of BIN numbers, for example, the card reading terminal may proceed to perform additional activities; and if outside of a certain range of BIN numbers, the additional activities that may be performed may be limited. A monetary balance associated with the obtained payment card may be determined, and the monetary balance data may be transmitted to the card reading device. Determining the monetary balance data associated with the obtained prepaid payment card data may include completing a balance inquiry transaction, or completing a sale transaction for a relatively small, predetermined sale amount. The monetary balance is representative of monetary funds available in an associated account. The card terminal may be configured to perform an aggregate balance check on a set of prepaid payment cards. For example, if the type of crime (e.g., felony versus lesser crime) involves exceeding a predetermined amount of money involved in the activity, the card terminal may be configured to collect the total balance of a plurality of payment cards that may be associated with such criminal activity in order to determine if the aggregate balance on such prepaid cards exceeds the predetermined amount of money associated with the crime type.

A card reading terminal may receive and transmit funds freeze request data. For example, the freeze request data may involve a pre-authorization transaction for the total balance of the prepaid card. Alternatively, or in addition, the freeze request data may involve negative file data, which is essentially placing the prepaid card on a "black list"—instructing the network to decline any request for a payment transaction using the prepaid card. Alternatively, or in addition, the freeze request data may involve a new transaction type (new packet type)—in this case, a "freeze" transaction in which the network marks the account frozen upon receiving the transaction.

A card reading terminal may receive and transmit funds seizure request data. The request data may include identification data associated with a legal entity authorized to seize prepaid payment card funds, and a payment card type. Once the identification data is confirmed, a seizure transaction may be executed on the account associated with the obtained prepaid payment card data. The seizure may include depositing funds from the account associated with the obtained prepaid payment card data, to the predetermined deposit account for seized prepayment card funds. The predetermined deposit account may be associated with a law enforcement agency, or a government agency, wherein the government agency may include a local government agency, a state government agency, a federal government agency, or an international government agency.

A seizure transaction may be executed by initiating a sales transaction via the card terminal. If the transaction authorization fails, the respective card terminal is notified of the authorization failure; if the transaction authorization succeeds, the respective card terminal is notified of the authorization success. Then, the seizure transaction completes a sale transaction by transferring the monetary funds of the respective payment card. Alternatively, or in addition, the seizure transaction may be executed by transmitting seizure file data to the network, which would include the prepaid account ID data and appropriate seizure account data. As a result of receiving such seizure file data, for example, the network can perform the funds transfer from the prepaid card account to the seizure account at the end of the business day. Alternatively, or in addition, the seizure request data may involve a new transaction type (new packet type)—in this case, a "seizure" transaction in which the network transfers funds from the prepaid card account to a designated seizure account (which may or may not be designated in the transaction data because, for example, such seizure accounts may be predetermined based upon the type of transaction).

With the above "freeze" and/or "seizure" transactions, information provided may include identification information of the prepaid card, such as the card number, the amount of transaction, and (if needed) seizure account information. Additional and/or optional information submitted with the transaction request may include jurisdiction identification information (such as a jurisdiction ID number), badge identification information (such as a badge ID number), authorization information (such as an authorization PIN number), time frame information (such as the amount of time to freeze the account), warrant identification information. On the issue processor side, the warrant identification information can be used, for example, to information pertaining to specifically issued warrants and the like.

A portion of the "seized" and/or "frozen" monetary funds may be provided to a third party processor and a card terminal provider. Alternately, a transaction fee may be paid to the third party processor and the card terminal provider.

The central database may be updated with the with the freeze and/or seizure transaction. One or more electronic merchant activity files may be generated. The updates may include the unique jurisdiction merchant ID(s), the unique jurisdiction location merchant ID(s), the merchant ID number(s), the merchant category code(s), the DBA identified), and information associated with the predetermined demand deposit account.

The method may be performed on a payment processing apparatus including one or more non-transitory computer-readable mediums having instructions thereon. The instructions are configured to operate a network accessible computer system to perform the operations of obtaining funds freeze request data and/or funds seizure request data transmitted from a card reading device. The funds freeze request data includes prepaid payment card data and may include information pertaining to the amount of funds to freeze. The funds seizure request data includes prepaid payment card data and/or identification data associated with an entity legally authorized to seize prepaid payment card funds and/or information pertaining to the amount of funds to seize. The identification data associated with the legal entity may be in the form of a unique merchant ID, a 'doing business as' (DBA) identifier, one or more unique merchant category codes, and/or one or more unique merchant ID numbers.

Upon confirming the identification data, the payment processing apparatus determines a monetary balance associated with the account associated with the obtained prepaid payment card data, and executes a freeze and/or seizure transaction on the account associated with the obtained prepaid payment card data. The freeze transaction may involve a pre-authorization transaction for the total balance of the prepaid card; may involve issuing a negative file, which is essentially placing the prepaid card on a "black list"—instructing the network to decline any request for a payment transaction using the prepaid card; or may involve issuing a new type of freeze transaction (new packet type) in which the network marks the account frozen upon receiving the transaction. The seizure transaction may include initiating a sale transaction, initiating a hold transaction and/or initiating a chargeback transaction. Alternatively, the seizure transaction may involve issuing a seizure file transaction to the network or issuing a new type of seizure transaction to the network. Following the freeze and/or seizure transaction, the method may include updating the central database with the transaction information.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and potential points of novelty are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn to methods, systems, devices and/or apparatus related to processing payment cards for freeze and/or seizure transactions. Specifically, the disclosed methods, systems, devices and/or apparatus relate to processing prepaid payment cards to check the balance of, freeze and/or seize monetary funds associated with prepaid payment cards.

Figure 1:
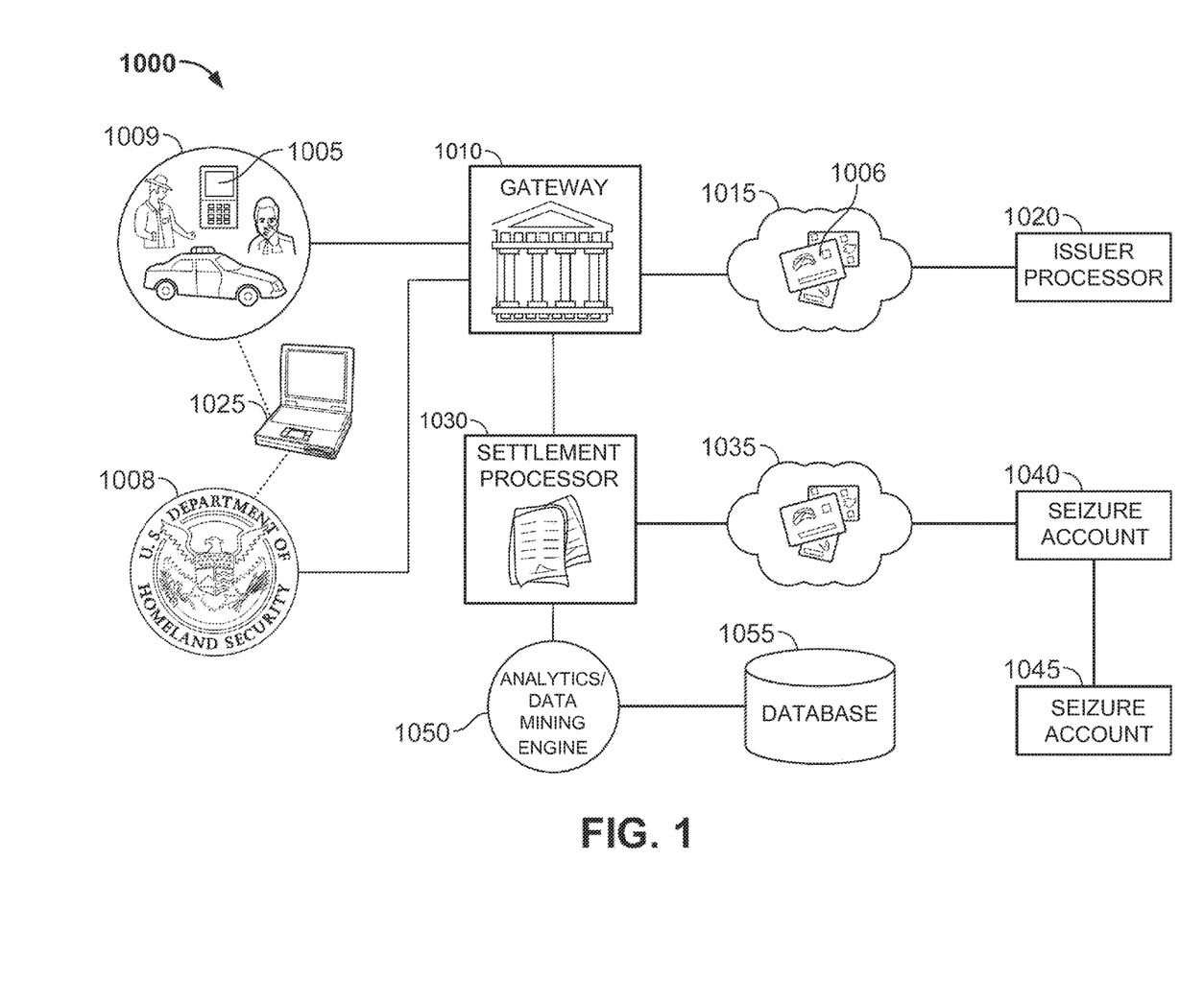
FIG. 1 depicts an example payment card processing system.

In FIG. 1, an example system 1000 for processing payment cards is depicted. Specifically, a law enforcement officer and/or investigative organization may wish to analyze, freeze and/or seize funds from one or more prepaid payment cards at a point of investigation 1009. Such prepaid payment cards may be scanned at the point of investigation 1009 using a card terminal (or similar device) 1005 to obtain prepaid payment card information (e.g., card number) from cards themselves (via a magnetic strip, for example) and to communicate card and transaction information between the various networks and account processors. Such payment card information may be transmitted to/from a prepaid card issuer processor 1020, via a gateway 1010 and card network (e.g., Visa/MC, Discover, Vantiv, etc) 1015, for example, that may determine the type of card 1006 (e.g., prepaid, credit, debit) and the monetary funds associated with the payment card's account. For transactions that may involve a "seizure" of funds to a government entity such as the U.S. Treasury 1040 and/or a law-enforcement agency 1045 account, the gateway 1010 can interact with a settlement processor 1030 for conducting such transactions with the network 1035 associated with the destination accounts.

A prepaid payment card reader terminal 1005 may scan or otherwise read data from a prepaid payment card. This allows efficient delivery of data to law enforcement agents in a quick, easy to understand and execute format. Payment card data may be obtained by use of a wireless or wired card terminal 1005 in the field at the point of arrest or investigation 1009. Payment cards and payment card terminals 1005 may incorporate magnetic stripes, smart cards, and/or near-field communications (NFC), among other technologies. The particular account 1006 associated with the prepaid payment card, may then be accessed via the card network 1015.

In some examples, card information and transaction information may be determined and transmitted/received via a network-accessible application 1008 that may be accessed from an Internet-capable computer 1025 or via an embedded application on the computer 1025 (of any combination of network-accessible or embedded application). In this manner, a high level of security, tracking of entered data, and aggregation of card swipe data may be maintain pursuant to Payment Card industry (PCI) Data Security Standard (DSS) requirements. Additionally, reporting of transactional and/or financial data may be provided by either a virtual terminal 1025 or a payment card terminal 1005. In some examples, an analytics engine 1050 and an associated database may be used to allow for comprehensive analytics to be performed using data from multiple transactions associated with the law enforcement and investigative activities on the various prepaid card accounts 1006.

An issue processor 1020 may respond to a data inquiry, such as a request of balance, and respond to the inquiry. The processor 1020 may receive transactional instructions, such as freezing or seizure of funds, and then may authorize such transactions and/or may otherwise act upon the transactional instructions. Transactions affecting the monetary funds (or balance) may then proceed. Example transactions may include "seizing" the monetary funds (or a portion thereof), "freezing" the monetary funds (or a portion thereof), and/or performing a "chargeback" to the monetary balance. "Seizing" the monetary funds may include, among other things, transferring the monetary funds to a financial institution account, transferring the monetary funds to a demand deposit account, settling the monetary funds into an account and/or performing a conventional sale transaction by a merchant (e.g., a law enforcement organization). "Freezing" the monetary funds may include placing a hold on the monetary funds, at least temporality settling the monetary funds into an account, and/or otherwise making the monetary funds unavailable for transfer. Performing a "chargeback" may include, among other things, transferring seized and/or held monetary funds back to the payment card account 1006.

The monetary funds associated with the card may have a portion diverted as fee for third party and card processors 1035, and a portion diverted to a predetermined deposit account belonging to a government treasury 1040 or a legal agency 1045, which may hold the seized funds.

Figure 2:
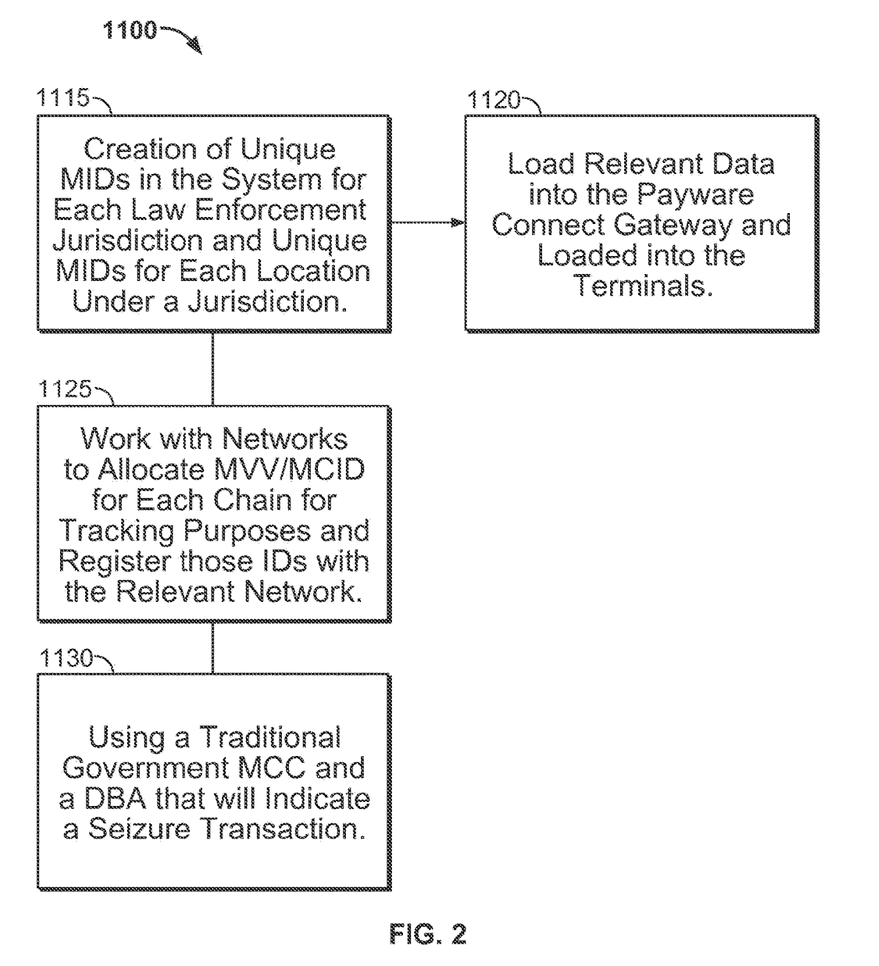
FIGS. 2-4 depict example processes of processing payment cards.
Figure 3:
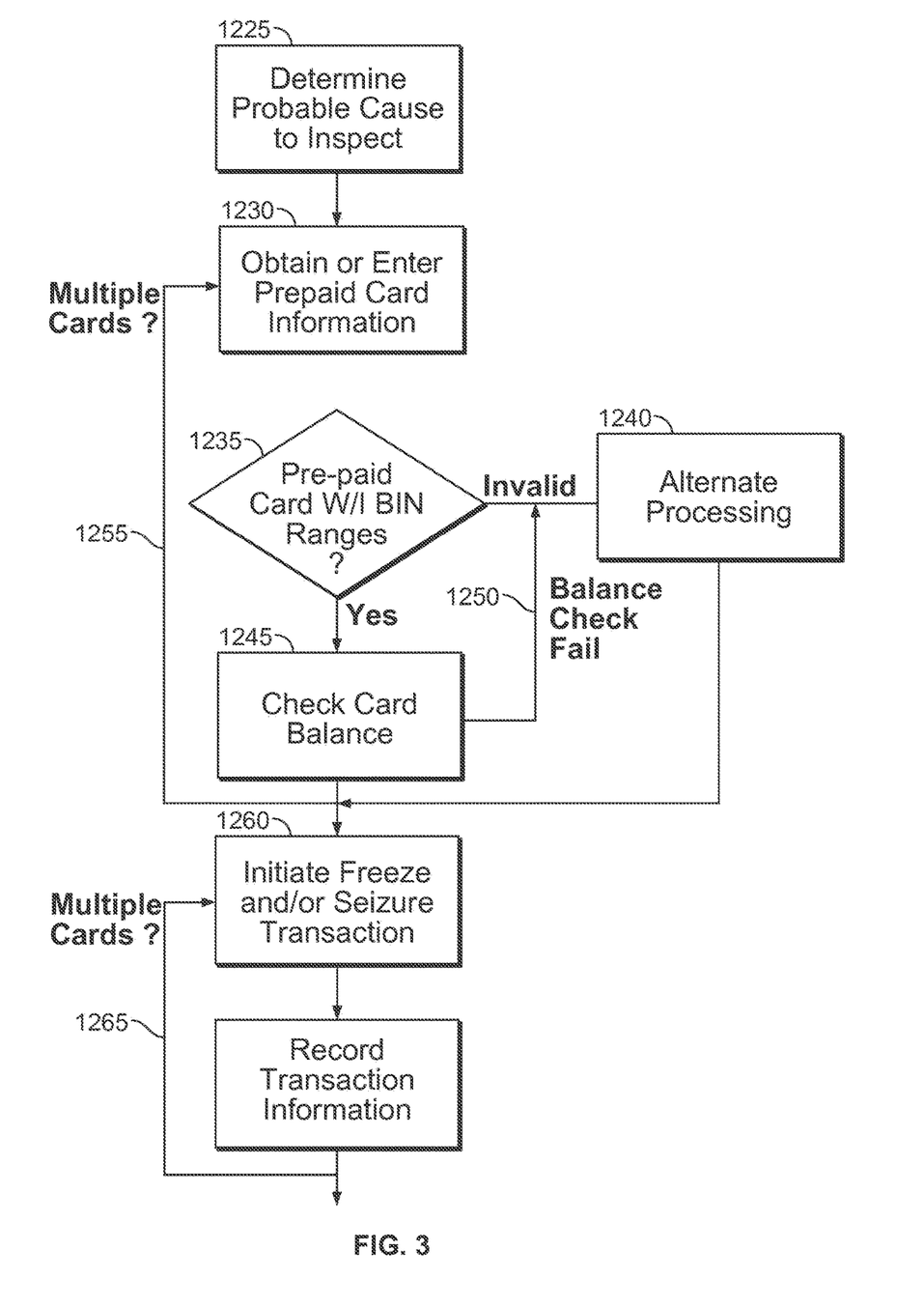
Figure 4:
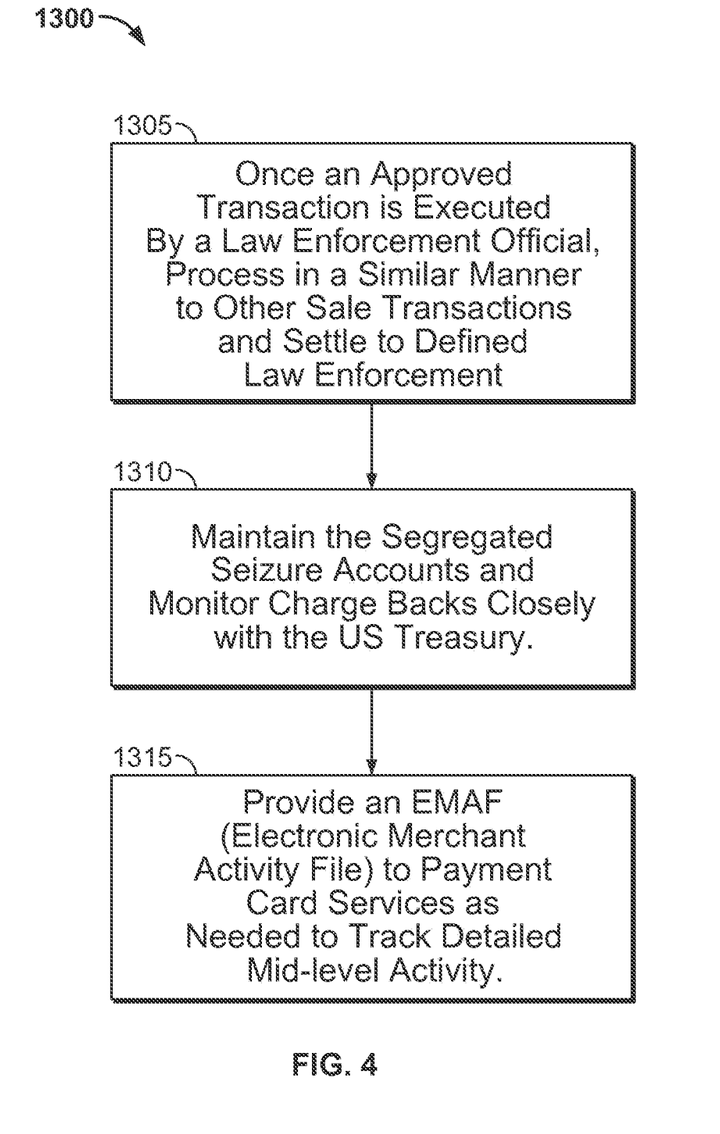

As generally depicted in FIGS. 2-4, example methods of processing payment cards may include one or more operations. In FIG. 2, method 1100 shows the top level operation of the example method. Operation 1115 generates a unique jurisdiction merchant IDs for each jurisdiction (MIDS), a unique jurisdiction location merchant ID for each location in each respective jurisdiction, and a "Doing Business As" (DBA) identifier(s) associated with a balance inquiry, funds freeze and/or seizure transaction, for example. In operation 1120 the unique jurisdiction merchant ID(s), the unique jurisdiction location merchant ID(s), the merchant ID number(s), the merchant category code(s), and the DBA identifier(s) may be transmitted or loaded into a payware connect gateway and corresponding payment card terminal. Operation 1125 tracks and registers the IDs with the relevant networks; merchant category codes may be provided. Merchant ID numbers for law enforcement agencies may be registered with payment networks (e.g., VISA®, MASTERCARD®, DISCOVER®, AMERICAN EXPRESS®). In operation 1130, a traditional government Merchant Category Code (MCC) and a "DBA" identifier initiates a seizure transaction, for example.

FIG. 3 depicts the steps of an example a freeze or seizure transaction at the law enforcement location. In operation 1225, officials make a determination of probable cause to check the balance on a card. When a law enforcement agency obtains a payment card (from a criminal or other entity), the law enforcement agency may determine the card type of the payment card. For example, at step 1230, a payment card may be scanned, swiped, or otherwise read by a payment card terminal 1005 at the point of investigation 1009 (or, alternatively, the payment card information may be entered into or read by the computer terminal 1025 at a remote location). Payment card information may be transmitted to a processing entity 1020 via the payment card terminal 1005 (or remote terminal 1025). For example a central database or processor 1020 may provide BIN tables to the gateway 1010 to facilitate checking the type card pre-paid, credit, debit, etc at step 1235. In response, the type of payment card (e.g., prepaid, credit, debit) may be transmitted to the payment card terminal 1005 (or remote computer 1025). Generally, this step involves checking the card account number information against predetermined BIN ranges associated with prepaid cards, for example. If the card account number falls within the predetermined BIN range a "valid" signal, for example, may be transmitted to the card reader 1005 or remote computer 1025, indicating that a broad set of transactions may be available for that card (such as balance Inquiry and other transactions). If the card number falls outside of the predetermined BIN range, an "invalid" signal, for example, may be transmitted to the card reader 1005 or remote computer 1025, indicating that a narrower set of transactions may be available as indicated by block 1240, alternate processing.

In operation 1245, if it is determined that the card is a pre-paid card (or otherwise within the predetermined range of BIN numbers), the system will then have an option to execute a balance inquiry transaction, and if the issuer processor responds, the system will provide a funds balance to law enforcement via card reader 1005 or remote terminal 1025. In operation 1245, determining the amount of monetary funds associated with a payment card may include completing a balance inquiry transaction and/or completing a sale transaction for a relatively small, predetermined sale amount (e.g., $1.00). The latter may allow a merchant access to the balance on the payment card. Action 1255 allows for batch processing a group of prepaid cards to determine an aggregate balance of the group of prepaid cards.

With the current disclosure, it may be possible to perform aggregate or batch balance inquiries on a plurality of prepaid cards. For example, if the type of crime (e.g., felony versus lesser crime) involves exceeding a predetermined amount of money involved in the activity, the card terminal 1005 and/or remote terminal 1025 may be configured to collect the total balance of a plurality of payment cards found at the point of investigation 1005 that may be associated with such criminal activity in order to determine if the aggregate balance on such prepaid cards exceeds the predetermined amount of money associated with the crime type.

If the remaining balance is not returned, in action 1250, a law enforcement agent may choose to perform alternate processing 1240, such as contacting the financial institution associated with the payment card to determine the monetary balance.

If the balance is returned, or at the end of the aggregate balance check, in operation 1260, after obtaining the monetary balance associated with the payment card(s), transactions may be initiated on the payment card(s) (and, accordingly, on the monetary funds associated with the payment card(s)). In operation 1280, assuming law enforcement has probable cause to freeze or to seize the funds, the card reader 1005 and/or terminal 1025 may have a freeze and/or seizure transaction capability. For example, a freeze or seizure transaction may be initiated via the payment card terminal 1005. In operation 1260, the desired funds freeze or funds-seizure transaction may be requested by the card reader 1005 and/or terminal 1025 and transmitted through the gateway 1010 to the network 1015 and provider 1020.

Various funds freeze transactions are contemplated by the current disclosure. The card reading terminal 1005 may transmit funds freeze request data to the gateway 1010 and onto the network 1015 and issuer processor 1020. For example, the freeze request data may involve a pre-authorization transaction for the total balance of the prepaid card. Alternatively, or in addition, the freeze request data may involve a type of sale transaction in which the funds are temporarily placed into an account (such as accounts 1040/1045 associated with government or law-enforcement entities). Alternatively, or in addition, the freeze request data may involve negative file data, which is essentially placing the prepaid card on a "black list"—instructing the network 1015 to decline any request for a payment transaction using the prepaid card. Alternatively, or in addition, the freeze request data may involve a new transaction type (new packet type)—in this case, a "freeze" transaction in which the network 1015 marks the account frozen upon receiving the transaction.

With respect to the negative file structure, the network may be configured to notify the issuer processor 1020 so that the issuer processor may cross-check the card information on the negative file against related transactions, related accounts and possible intra-bank transfer requests.

Seizure transactions may include initiating a sale transaction via the payment card terminal 1005 or remote terminal 1025 to effectuate a funds transfer from the prepaid card account 1008 to the seizure account 1040/1045. Further, a transaction authorization may be requested and/or initiated. If the transaction authorization falls, the payment card terminal may be notified of the authorization failure, and the payment card terminal may display such notice to a user. If the transaction authorization succeeds, the payment card terminal may be notified of the authorization success, and the payment card terminal may display such notice to a user.

In some examples, the monetary funds (or at least a portion thereof) of the respective payment card may be transferred to a predetermined demand deposit account. In some examples, such demand deposit account may be associated with, owned, and/or controlled by a government agency, including local, state, federal and/or international agencies, in some examples, the demand deposit account may be associated with, owned, and/or controlled by a law enforcement agency.

Alternatively, or in addition, the seizure transaction may be executed by transmitting seizure file data to the network 1015, which would include the prepaid account ID data and appropriate seizure amount data. As a result of receiving such seizure file data, for example, the network 1015 can perform the funds transfer from the prepaid card account 1008 to the seizure account 1040/1045 at the end of the business day. Alternatively, or in addition, the seizure request data may involve a new transaction type (new packet type)—in this case, a "seizure" transaction in which the network 1015 transfers funds from the prepaid card account 1006 to a designated seizure account (which may or may not be designated in the transaction data because, for example, such seizure accounts may be predetermined based upon the type of transaction) 1040/1045.

In some examples, a requested transaction may include initiating a chargeback transaction via a payment card terminal 1005 or remote terminal 1025, and completing the chargeback transaction by refunding and/or releasing the monetary funds (or at least a portion thereof) of the payment card to the payment card account 1006.

With the above "freeze" and/or "seizure" transactions, information provided may include identification information of the prepaid card, such as the card number, the amount of transaction, and (if needed) seizure account information. Additional and/or optional information submitted with the transaction request may include jurisdiction identification information (such as a jurisdiction ID number), badge identification information (such as a badge ID number), authorization information (such as an authorization PIN number), time frame information (such as the amount of time to freeze the account), warrant identification information. On the issue processor side, the warrant identification information can be used, for example, to information pertaining to specifically issued warrants and the like.

Returning to FIG. 3, following the freeze and/or seizure transaction step 1260, the associated freeze or seizure transaction data is recorded, such as on the database 1055 for record-keeping and/or subsequent data processing and analytics by the analytics engine 1050. Finally, fine 1285 is provided to indicate that such freeze and/or seizure transactions may be performed on the group of prepaid cards.

In association with the possible aggregate or batch processing, all such prepaid cards in the batch may be tied together in the system so that each may be associated with the same crime(s), investigated party(s), warrant(s) and the like. As discussed above, if a check of a prepaid card in a batch of such prepaid card returns an "invalid" signal fn the BIN-range check, it still may be desirable to perform a "freeze" or "seizure" transaction on the card if it is tied to a group of prepaid cards associated with a particular criminal activity and/or actor. Additionally, by the analytics and data mining engine 1050 can be used to find additional prepaid card accounts, providers, actors and the like that may be associated with or otherwise tied to the group of prepaid cards in the current batch. Alternatively, the analytics and data mining engine 1050 can be used to obtain account information from prepaid cards in the batch, using available search algorithms, to which the system is unable to obtain access and/or authorization.

FIG. 4 illustrates detailed steps 1300 involved in an exemplary funds seizure transaction. In operation 1305, once an approved transaction is executed by a law enforcement official, it will be processed in a similar manner to other sale transactions and settle to defined law enforcement DDA (in the case of Department of Homeland Security, an account defined by FMS/US Treasury). In operation 1310, a central database may maintain the segregated seizure accounts and monitor chargebacks closely with government agencies, for example the US Treasury. In operation 1315, an EMAF (Electronic Merchant Activity File) is provided to payment card services as needed to track detailed Mid-level activity.

In some examples, an electronic merchant activity file(s) may be generated. Such file(s) may include the unique jurisdiction merchant ID(s), the unique jurisdiction location merchant ID(s), the merchant ID number(s), the merchant category code(s), the DBA identifier(s), and/or information associated with the predetermined demand deposit account. In some examples, the electronic merchant activity file(s), the unique jurisdiction merchant ID(s), the unique jurisdiction location merchant ID(s), the merchant ID number(s), the merchant category code(s), the DBA identifier(s), information associated with the predetermined demand deposit account, the issuing financial institution, and/or the seizure transaction information may be transmitted to government agencies.

In some examples, a third party processor and/or a card terminal provider may receive financial consideration. For example, a third party processor and/or a card terminal provider may receive a portion of the predetermined demand deposit account, a portion of the monetary funds of the respective payment card being seized, a portion of the seizure transaction value, and/or a fee associated with any seizure transaction.

Figure 5:
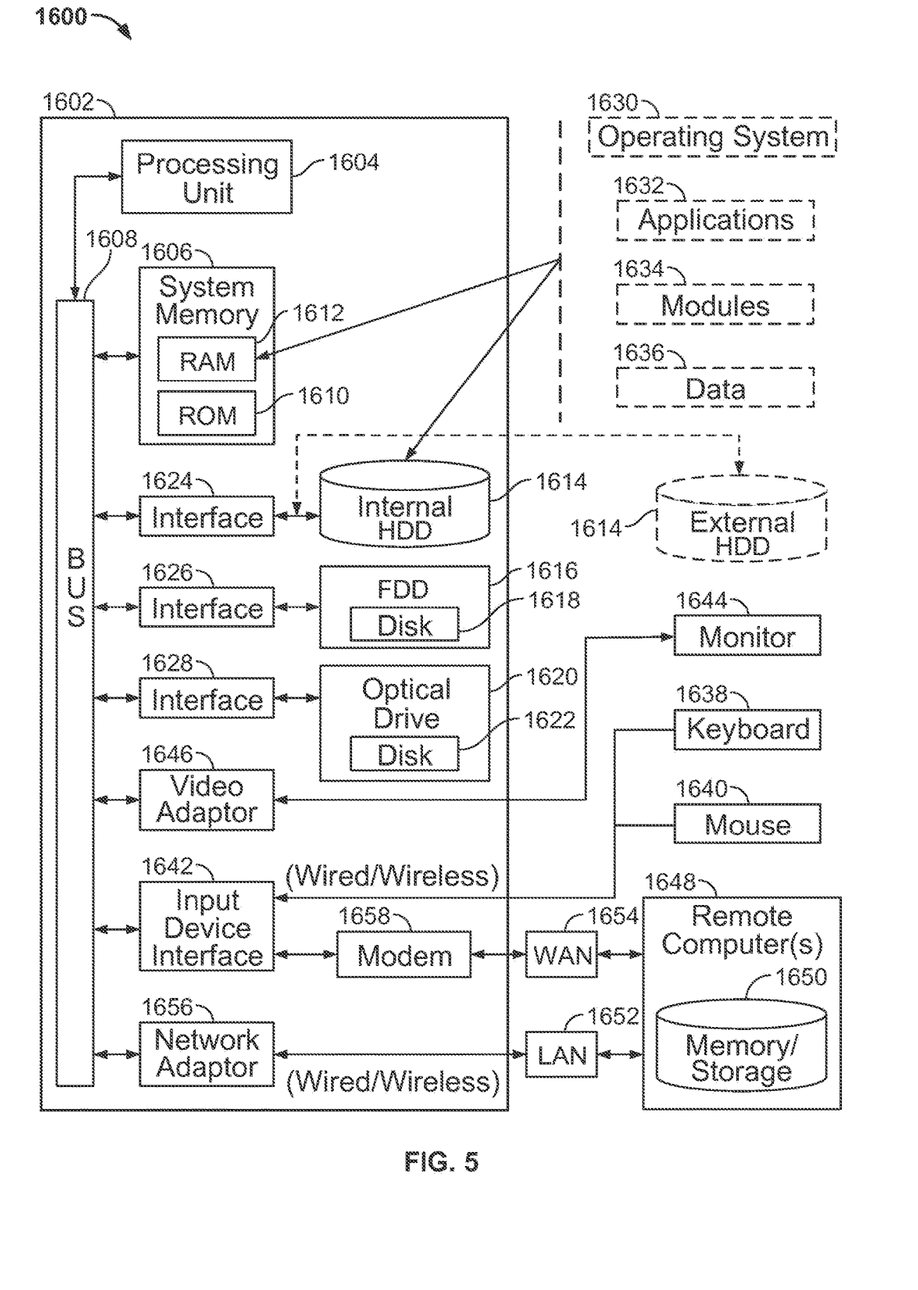
FIG. 5 depicts an example environment configured to process payment cards; all arranged in accordance with at least some embodiments of the present disclosure.

FIG. 5 illustrates an exemplary environment 1600 for implementing and/or controlling various aspects of an example system that includes a computer 1602, the computer 1602 including a processing unit 1604, a system memory 1608 and a system bus 1608. The system bus 1608 couples system components including, but not limited to, the system memory 1606 to the processing unit 1604. The processing unit 1604 can be any of various commercially available processors. Dual microprocessors and other multi-processor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616. (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of an example system.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that an example system can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) may include a microphone, an IR remote control a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or ail of the elements described relative to the computer 1602, although, for purposes of brevity, only a memory storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1602 is connected to the local network 1652 through a wired and/or wireless communication network interface or adapter 1656. The adaptor 1656 may facilitate wired or wireless communication to the LAN 1652, which may also include a wireless access point disposed thereon for communicating with the wireless adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642, in a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic IDBaseT wired Ethernet networks used in many offices.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method of processing one or more prepaid payment cards, comprising:
   maintaining a central database related to prepaid payment card information on one or more payment cards;
   providing a predetermined deposit account for seized prepaid payment card funds;
   obtaining funds seizure request data transmitted from a card reading device, the funds seizure request data including prepaid payment card data and identification data associated with an entity legally authorized to seize prepaid payment card funds;
   upon confirming the identification data, executing a seizure transaction on an account associated with the obtained prepaid payment card data, the seizure transaction including depositing funds from the account associated with the obtained prepaid payment card data to the predetermined deposit account for seized prepaid payment card funds; and
   updating the central database with the seizure transaction.

2. The method of processing one or more payment cards of claim 1, further including a step of generating the identification data, the step of generating the identification data including one or more of the following:
   generating a unique jurisdiction merchant ID for each jurisdiction;
   generating a unique jurisdiction location merchant ID for each location in each respective jurisdiction;
   generating one or more "Doing Business As" (DBA) identifiers associated with the seizure transaction;
   providing a plurality of merchant category codes; and
   registering one or more merchant ID numbers for a payment network.

3. The method of processing one or more payment cards of claim 2, wherein the step of updating the central database with the seizure transaction further includes: generating one or more electronic merchant activity files to include at least one of: the unique jurisdiction merchant ID(s), the unique jurisdiction location merchant ID(s), the merchant ID number(s), the merchant category code(s), the DBA identifier(s), and information associated with a predetermined deposit account.

4. The method of processing one or more payment cards of claim 1, further comprising the steps of:
   determining monetary balance data associated with the obtained prepaid payment card data; and
   transmitting the monetary balance data to the card reading device.

5. The method of processing one or more payment cards of claim 4, wherein determining monetary balance data associated with the obtained prepaid payment card data includes at least one of: completing a balance inquiry transaction, and completing a sale transaction for a relatively small, predetermined sale amount.

6. The method of processing one or more payment cards of claim 4, further including:
   if the transaction authorization fails, notifying the respective card terminal of the authorization failure; and
   if the transaction authorization succeeds, notifying the respective card terminal of the authorization success, and completing the seizure transaction as a sale transaction by transferring a at least a portion of monetary funds held in the account associated with the prepaid payment card data to the predetermined deposit account for seized prepaid payment card funds.

7. The method of processing one or more payment cards of claim 1, where the step of executing a seizure transaction includes initiating a transaction authorization.

8. The method of processing one or more payment cards of claim 1, further including categorizing at least portion of the monetary funds in the account associated with the prepaid payment card data as seized monetary funds in the central database.

9. The method of processing one or more payment cards of claim 1, wherein the predetermined deposit account is associated with at least one of the following:
a law enforcement agency; and
a government agency, wherein the government agency includes at least one of: a local government agency, a state government agency, a federal government agency, an international government agency.

10. The method of processing one or more payment cards of claim 1, further comprising paying at least a portion of the monetary funds deposited into the predetermined deposit account to least one of a third party processor and a card terminal provider.

11. The method of processing one or more payment cards of claim 1, further comprising paying a transaction fee to least one of a third party processor and a card terminal provider.

12. A method of processing one or more prepaid payment cards, comprising:
maintaining a central database related to prepaid payment card information on one or more payment cards;
obtaining funds seizure request data or funds freeze request data transmitted from a card reading device, the funds seizure request data or funds freeze request data including prepaid payment card data and identification data associated with an entity legally authorized to seize or freeze prepaid payment card funds;
upon confirming the identification data, executing a respective freeze or seizure transaction on an account associated with the obtained prepaid payment card data; and
updating the central database with the freeze or seizure transaction.

13. The method of processing one or more payment cards of claim 12, further comprising a step of initiating a chargeback transaction on the account associated with the prepaid payment card data.

14. A payment processing apparatus, including one or more non-transitory computer-readable mediums having instructions thereon, the instructions configured to operate a network accessible computer system to perform the operations of:
obtaining prepaid payment card data associated with a prepaid payment card;
obtaining at least one of funds seizure request data and funds freeze request data transmitted from at least one of a card reading device and a remote terminal, the one of funds seizure request data and funds freeze request data including the prepaid payment card data and including identification data associated with a government or law-enforcement entity legally authorized to freeze or seize prepaid payment card funds;
upon confirming the identification data, obtaining monetary balance data associated with an account associated with the obtained prepaid payment card data, and executing at least one of a freeze transaction and a seizure transaction on an account associated with the obtained prepaid payment card data utilizing the monetary balance data; and
updating the central database with the at least one freeze and seizure transaction.

15. The payment processing apparatus of claim 14, wherein the identification data associated with a government or law-enforcement entity is in the form of at least one of: a unique merchant ID, a 'doing business as' (DBA) identifier, one or more unique merchant category codes, and one or more unique merchant ID numbers.

16. The payment processing apparatus of claim 14, wherein the at least one of a freeze transaction and a seizure transaction includes a freeze transaction taken from a group consisting of:
a pre-authorization transaction for submission to a payment card network in accordance with the monetary balance data;
a temporary funds transfer transaction;
a negative file notification to for submission to the payment card network, resulting in the card identifying information being placed on a negative file list of frozen accounts accessible by at least one of the payment card network and an issuer processor; and
a dedicated funds freeze transaction for submission to the payment card network.

17. The payment processing apparatus of claim 14, wherein the at least one of a freeze transaction and a seizure transaction includes a seizure transaction taken from a group consisting of:
a sale transaction for submission to a payment card network in accordance with the monetary balance data and including an account associated with the government or law-enforcement entity as the vendor account;
a seize file notification to for submission to the payment card network, resulting in the card identifying information being placed on a seize file list of accounts accessible by at least one of the payment card network and an issuer processor; and
a dedicated funds seizure transaction for submission to the payment card network.

* * * * *